Figure 5:
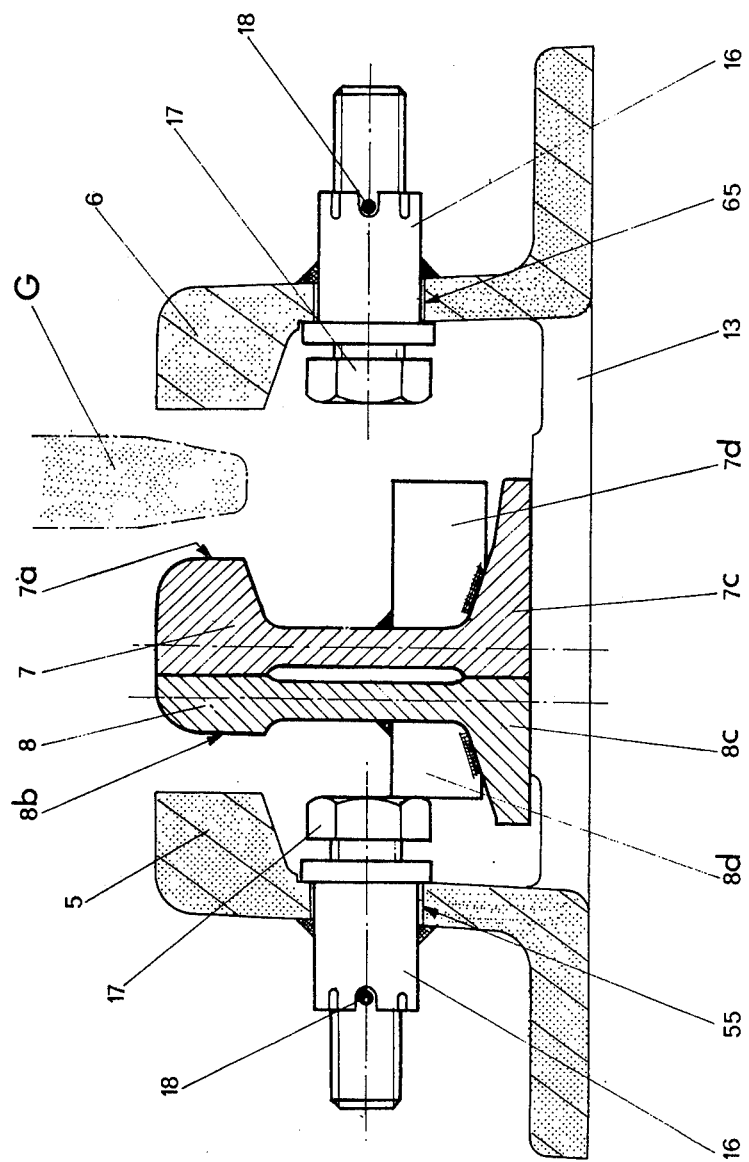

United States Patent [19]

Ferbeck et al.

[11] 4,032,095
[45] June 28, 1977

[54] CENTRAL GUIDE SYSTEM FOR VEHICLES

[75] Inventors: Daniel Ferbeck, Issy les Moulineaux; René Groznykh, Maisons Laffitte; Patrick de la Ville de Rigné, Sevres, all of France

[73] Assignee: Engins Matra & de Dietrich & CIA, Paris, France

[22] Filed: Apr. 9, 1976

[21] Appl. No.: 675,474

[30] Foreign Application Priority Data
Apr. 14, 1975 France .............................. 75.11586

[52] U.S. Cl. .......................... 246/442; 246/435 R
[51] Int. Cl.[2] ......................................... E01B 7/02
[58] Field of Search ............. 246/435 R, 430, 438, 246/317, 318, 319, 375, 377, 382, 385, 387, 388, 392, 424, 427, 454, 442; 104/130, 132

[56] References Cited
UNITED STATES PATENTS
1,064,499  6/1913  Laney .................................. 246/442
3,785,294  1/1974  Omar .................................. 104/130

FOREIGN PATENTS OR APPLICATIONS
718,214  3/1942  Germany ....................... 246/415 R Primary Examiner—Trygve M. Blix
Assistant Examiner—Reinhard J. Eisenzopf
Attorney, Agent, or Firm—Kinzer, Plyer, Dorn & McEachran

[57] ABSTRACT

This invention is relative to a vehicle-guiding system provided with support means and a steering means such as a roller running along a flange way, characterized in that it comprises a points system connecting a track to two tracks and formed by a point and a matching point each secured at their heel end facing the two tracks, the other ends of point and matching point bearing against one another and pivoting between a position in which tracks are connected.

4 Claims, 6 Drawing Figures

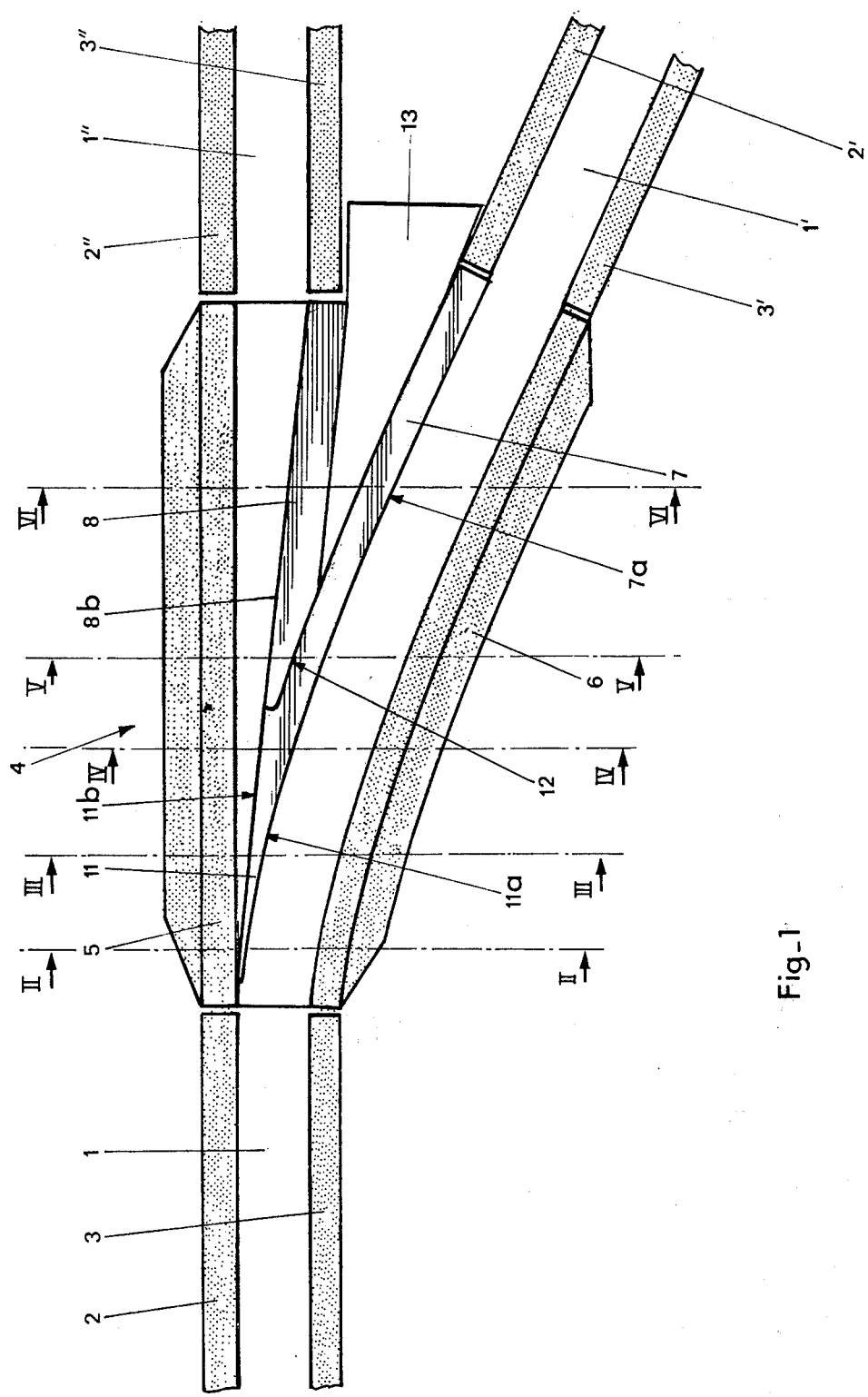
Fig_1

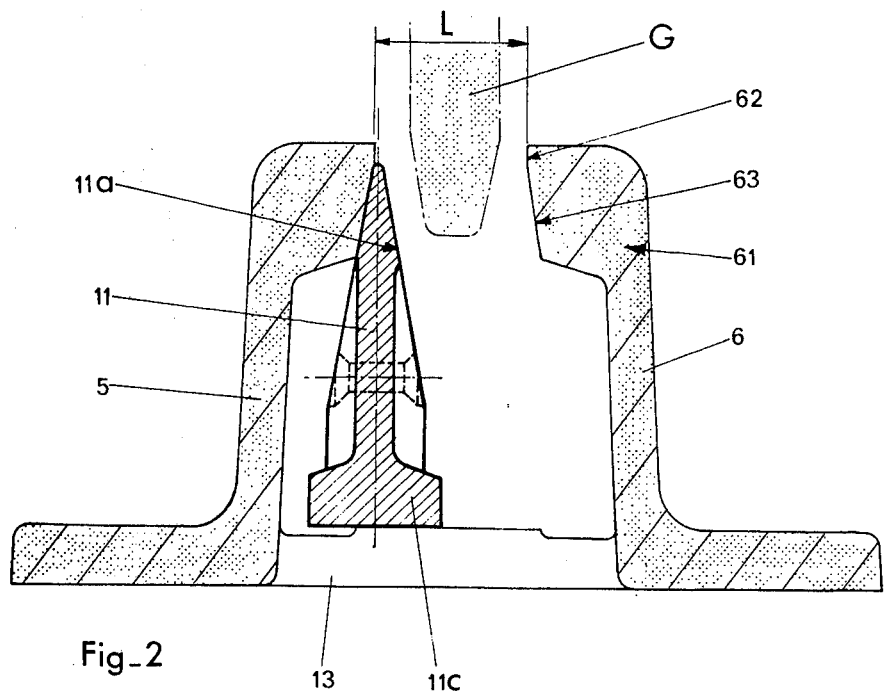
Fig_2
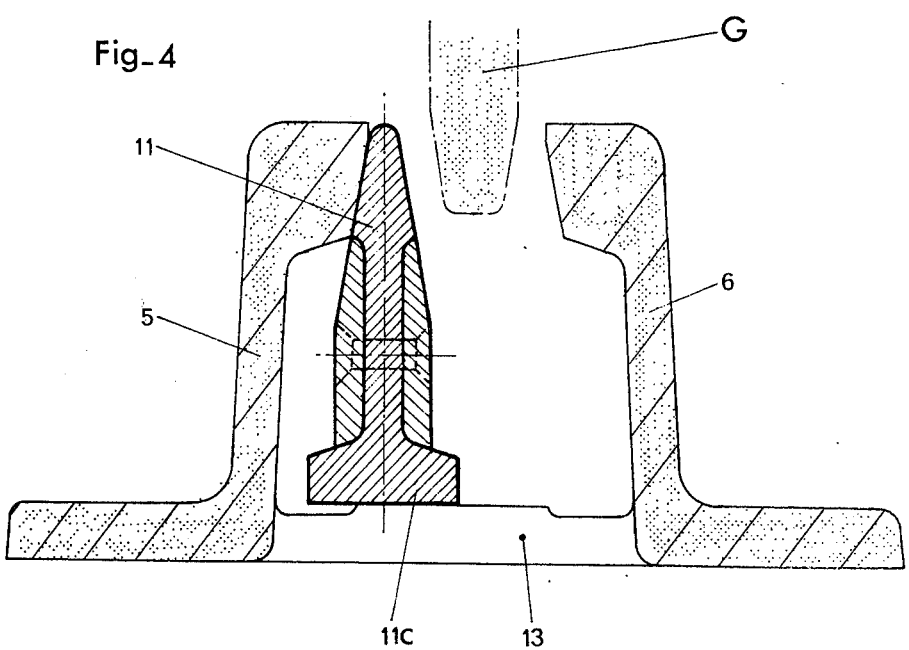
Fig_4

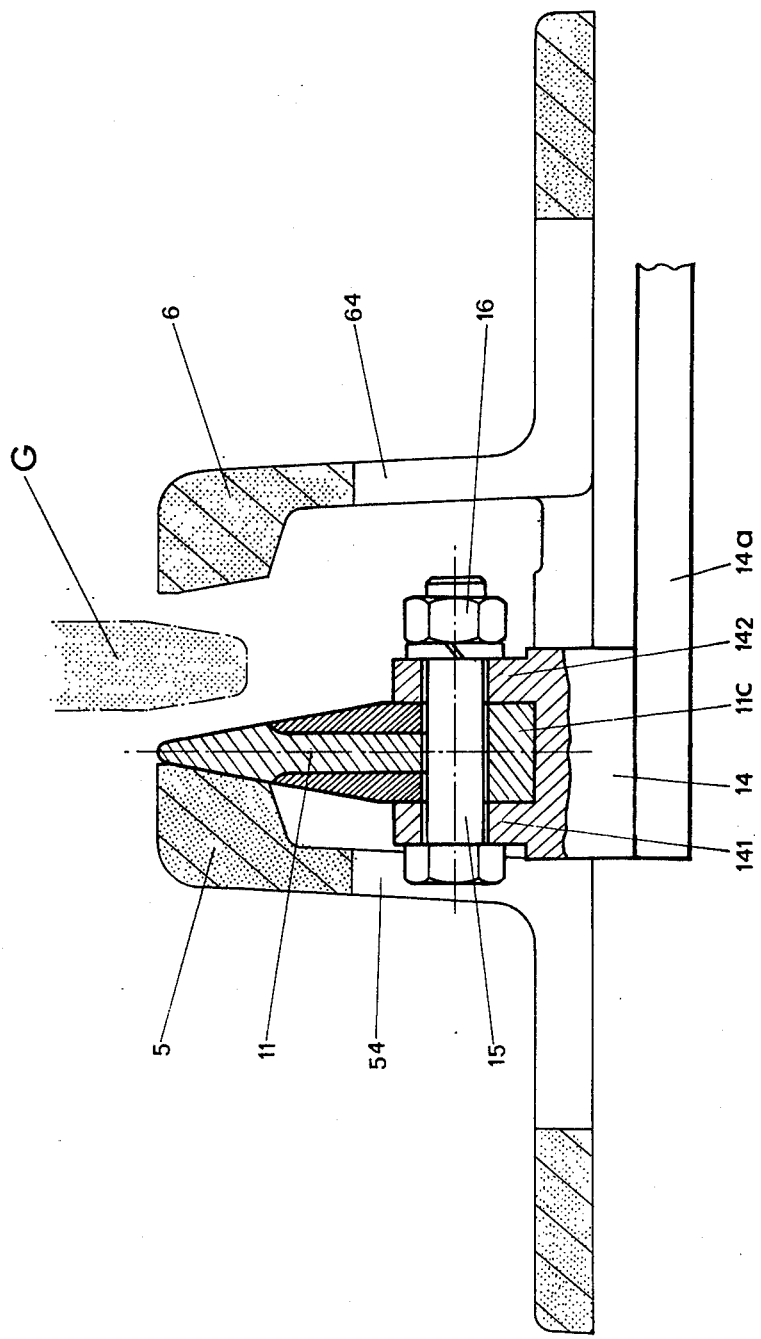

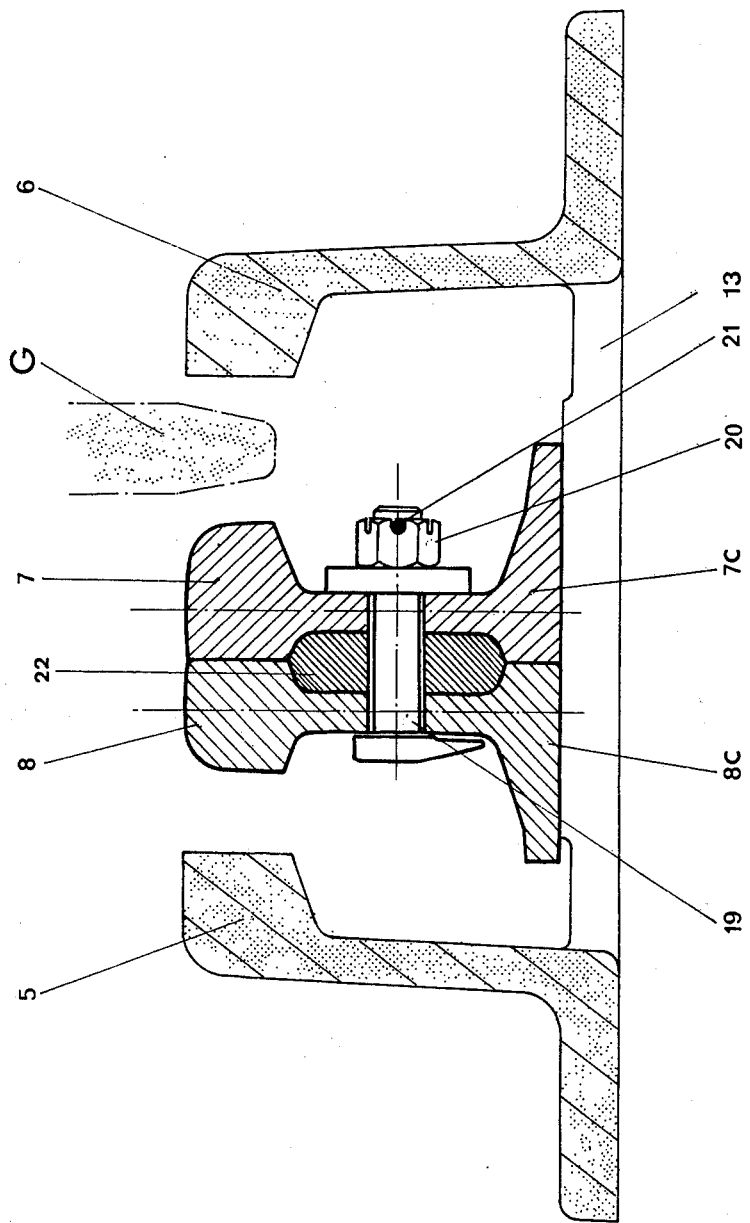
Fig_6

CENTRAL GUIDE SYSTEM FOR VEHICLES

Vehicle guide systems are already known. French Pat. Specification No. 706 597 describes a method of guiding vehicles wherein runways are provided for wheels with resilient tires and the axles have rollers bearing either on a vertical rib or on the side walls of a guide track.

French Pat. Specification No. 1 020 341 describes a system for guiding vehicles which are separated from the supporting wheels. The vehicle steering axle is provided with steering wheels. In a first kind of guide means, the steering axle comprises two horizontal guide wheels cooperating with a guide rail which projects with respect to the runway. In another proposed method, the guide wheels are driven along the walls of a guide track. In another proposed method, the axle is provided with a guide roller adapted to rotate around an axis parallel to that of the axle. The guide roller follows a groove in the runway. The last-mentioned document, however, does no describe any means for pointing a vehicle.

The various proposed methods have the disadvantage of not solving the pointing problem.

In railway guide systems, a change of route is usually obtained by means of a points and crossing or "single turnout"; a number of single turnouts can be combined to connect two substantially parallel tracks at a crossover junction or two intersecting tracks at single or double slip points. Single turnouts can overlap in the same direction to form double turnouts, or can overlap in the reverse direction to form intersecting turnouts. These conventional points and crossing systems comprise one or more crossings and points systems comprising movable points. The total length of the systems is usually between 20 and 50 meters, and it is necessary to move heavy components which have considerable inertia since, with regard to the forces in play, the points and the crossing frogs are subjected to vertical stresses when supporting the vehicle and simultaneously subjected to horizontal stresses when guiding the vehicle.

Owing to the presence of vertical and horizontal stresses, the points system has to be specially designed to ensure that the points have suitable strength in both planes. In addition, the points become worn at the sides as a result of guiding and on the horizontal surface as a result of the traffic.

It is clear from these remarks that a points system of this kind cannot be efficiently used for central guiding. In order to produce a change of direction, in the case of central guiding by horizontal tires, it will be necessary to move one of the guide ramps for a length equal to that of the pointing system. This will necessitate moving heavy, bulky components which are slow to operate.

Furthermore, the devices are very bulky and thus can never be combined in a two-way track, but must always be used on one-way track.

An object of the invention is to provide a guide system, inter alia a points system for guiding a vehicle moving along a one-way or two-way track, by means of guide rollers movinng in flange ways, the system being very compact and compatible with two-way tracks compatible with level crossings for vehicles such as cars or lorries.

To this end, the device according to the invention has the advantage of a simple, compact construction and consequently low inertia. Owing to the small masses in movement and the small clearance for changing over from one position to another, the points can be operated very quickly. The points control means are low-powered.

These various features are important when the system is incorporated in a two-way track.

Furthermore, the use of a single point system (point and matching point) reduces maintenance, particularly since the device is subjected only to horizontal and not to vertical forces, and can therefore be smaller.

The invention will be described in greater detal with reference to an embodiment shown diagrammatically in the accompanying drawings in which:

- FIG. 1 is a plan view of a guide device according to the invention, showing the points;
- FIG. 2 is a view in section along II—II of FIG. 1;
- FIG. 3 is a view in section along III—III of FIG. 1;
- FIG. 4 is a view in section along IV—IV of FIG. 1;
- FIG. 5 is a view in secton along V—V of FIG. 1, and
- FIG. 6 is a view in section along VI—VI of FIG. 1.

In FIG. 1, the guide system according to the invention comprises a flange way 1 bounded on each side by a guide rail 2, 3. At a points system 4, the track divides into a track 1' bounded by a guide rail 2', 3' on each side, and a track 1" similarly bounded by rails 2", 3".

The points system is made up of two outer rails 5, 6 and a mobile assembly made up of a point 7 and a matching point 8. Point 7 is laterally moved by bending its heel around the place where it fits into the stationary part 2' and by bending the matching point 8 at its heel where it is secured in the stationary part 3", the two stationary parts being cast integrally with parts 5 and 6.

In FIG. 1, the track or front end 11 of point 7 is pressed against the guide rail 5, so that the points system connects tracks 1 and 1'. Under these conditions, the guide roller is guided along surface 11a, 7a of point 7.

On the other hand, when the tongue 11 of point 7 is pressed against rail 6, point 7 moves relative to the matching point 8 so that the front end of the matching point 8 slides with respect to a cut-out portion 12 of tongue 11. In this position, the guide roller is guided along the lateral surface 11b, 8b of the front end of point 7 and of the matching point 8.

The end of the matching point 8 is strengthened by the cut-out portion 12 of point 11. Alternatively, the system according to the invention need not have a cut-out portion, in which case the end of the matching point 8 should taper so as to fit against the lateral surface 116 of point 7.

FIG. 2 in cross-section shows the two side rails 5, 6 defining the flange way of the track at the entrance to the guide system. The front end 11 of point 7 is pressed against rail 5.

A base 13 provides a mechanical connection between rails 5, 6, and also bears the heel 11c of the end 11 of point 7.

Roller G is guided between surface 11a of point 11 and the corresponding surface of rail 6.

As FIG. 2 shows, the top ends of rails 5, 6 have a lower part 63 which is inclined and bent back at an angle subsantially equal to the angle of roller G. Consequently, the flange-way aperture $l$ is considerably greater than the thickness of roller G.

In the plane of FIG. 3, the end 11 of point 7 is connected to a tongue attachment 14 having two arms 141 and 142 gripping the heel 11c of end 11. The assembly is secured together by a bolt 15 and screw 16.

In order to allow unhindered transverse motion of the thus-formed assembly, rails 5, 6 are formed with cutout portions 64, 54 so as to provide space for bolt 15 and screw 16.

In the plane of FIG. 3, the top part of end 11 is already level with rails 5, 6. Tongue 14 is connected to a control linkage 14a which in turn is connected to a motor or electromagnet (not shown).

FIG. 4, in cross-section, shows a system similar to FIG. 2 except that the top of end 11 is level with the top surface of rails 5, 6.

FIG. 5, in cross-section, shows point 7 and matching point 8. The top part of point 7 forms a guide surface 7a cooperating with roller G in the switching-over position shown in FIG. 1.

Abutments 7d, 8d are provided opposite heels 7c, 8c respectively. Abutments 7d, 8d cooperate with adjustable counter-abutments 65, 55 secured to rails 6, 5 respectively. Each counter-abutment comprises a threaded socket 16 receiving a bolt 17 prevented from rotating by a pin 18.

FIG. 6, in cross-section, shows how point 7 and matching point 8 are connected by a bolt 19 and a nut 20 locked by a pin 21. The body of bolt 19 extends into an oblong hole in points 7 and 8, perpendicular to the plane of the drawing, so as to allow sliding between the surfaces of points 7, 8 in contact, when the points system pivots from one side to another.

A sliding joint 22 is provided so that means 7, 8 can slide relative to one another.

The guide system according to the invention is suitable for guiding vehicles on one-way tracks (e.g. in the underground) or two-way tracks for traffic such as vehicles on pneumatic tyres, inter alia buses or trolleybuses guided by a central system compatible with a two-way track.

The invention is not necessarily limited to passenger traffic, but can also be applied to installations for distributing and storing components and using chains or the like, in which case vehicles can be guided while travelling on two-way tracks, i.e., without interfering with the movement of people or other vehicles. Of course, the invention is not limited to the embodiment described and shown, but can be modified in other ways without departing from its scope.

We claim:

1. A rail points system for a rail turn-out for connecting one track, having two guard rails defining a flange way, selectively to either of two other tracks, each of the other tracks comprising two guard rails defining, respectively, two flange ways, said points system comprising a point and separate matching point respectively having heel ends respectively aligned with a rail of each of the other two tracks, said point and matching point having opposed side portions engaged with one another, said point and matching point being connected for lateral movement in unison between a first position where said one track is connected to one of the other two tracks and a second position where said one track is connected to the second of said other two tracks, and said connecton being such that limited longitudinal sliding movement occurs between the point and matching point during said lateral movement.

2. System according to claim 1 in which the end of the point opposite the heel end extends beyond the corresponding end of the matching point.

3. System according to claim 2 in which the side of the point opposite the matching point is recessed, with the end of the matching point opposite the heel end fitting in said recess.

4. System according to claim 1 in which said connection comprises a bolt extending through the point and matching point of which one includes an oblong slot through which the bolt is passed.

* * * * *